United States Patent [19]
Vroman

[11] 3,770,460
[45] Nov. 6, 1973

[54] METHOD OF PRODUCING A MOLDED FROZEN BODY

[75] Inventor: Robert H. Vroman, Toledo, Ohio

[73] Assignee: Vroman Foods, Inc., Toledo, Ohio

[22] Filed: Nov. 13, 1969

[21] Appl. No.: 876,493

[52] U.S. Cl. .............................................. 426/279
[51] Int. Cl. .............................................. A23g 5/02
[58] Field of Search ...................... 99/138 S, 137; 107/54 EA

[56] References Cited
UNITED STATES PATENTS
| | | | |
|---|---|---|---|
| 2,747,525 | 5/1956 | Lund | 99/137 X |
| 2,048,364 | 7/1936 | Willems | 99/137 |
| 3,274,958 | 9/1966 | Otken | 99/137 |

FOREIGN PATENTS OR APPLICATIONS
| | | | |
|---|---|---|---|
| 845,968 | 8/1960 | Great Britain | 99/137 |
| 746,363 | 3/1956 | Great Britain | 107/54 EA |
| 38/2772 | 3/1963 | Japan | 99/137 |

*Primary Examiner*—Tim R. Miles
*Attorney*—Harry O. Ernsberger

[57] ABSTRACT

The disclosure embraces a method of making a novel frozen product wherein the edible constituents in liquid or flowable condition are successively introduced into a mold and subjected to reduced temperatures or subfreezing conditions controlled to freeze portions of the liquid constituents including displacing a quantity of an unfrozen constituent with a liquid constituent of lesser specific gravity to provide layers or bodies of the edible constituents in contiguous relation in the frozen confection.

10 Claims, 11 Drawing Figures

INVENTOR.
ROBERT H. VROMAN
BY
Harry O. Ernsberger
ATTORNEY

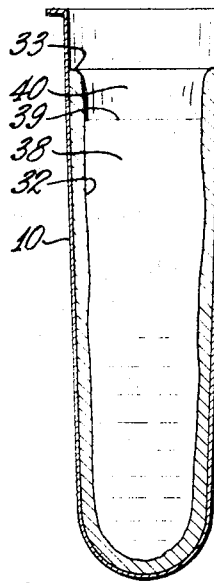
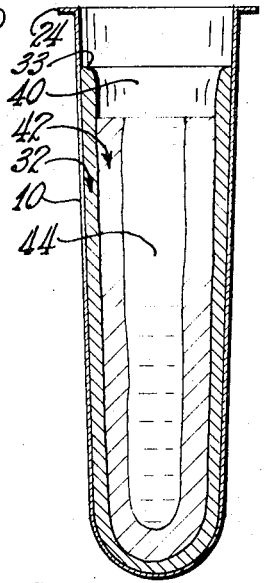
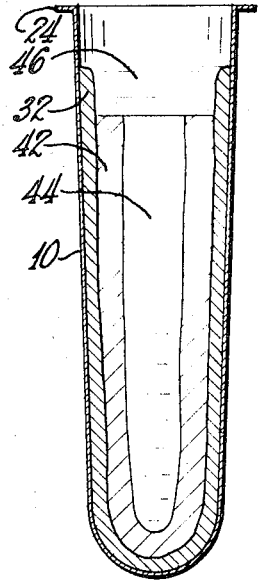
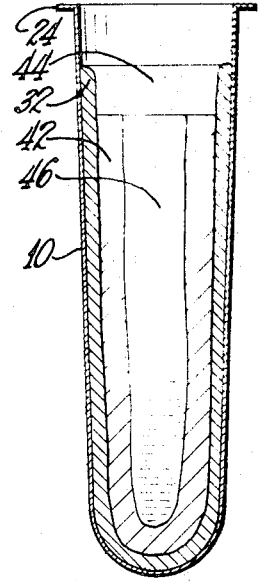
Fig. 4  Fig. 5  Fig. 6  Fig. 7
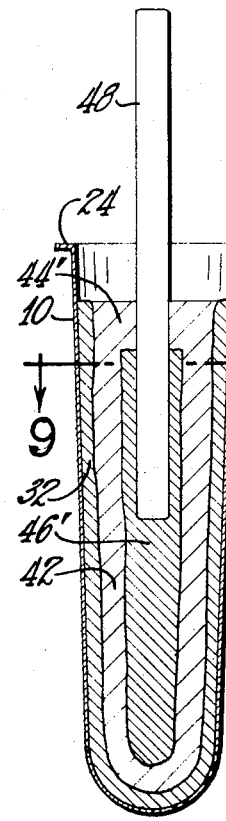
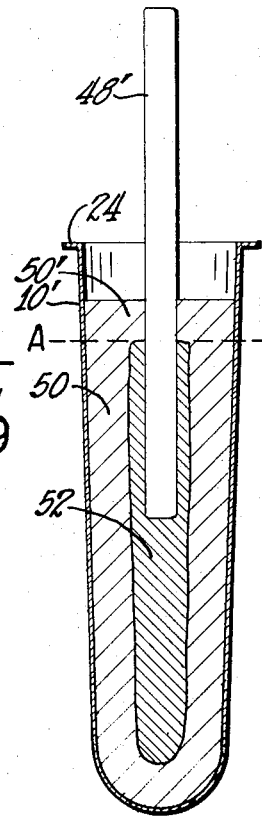
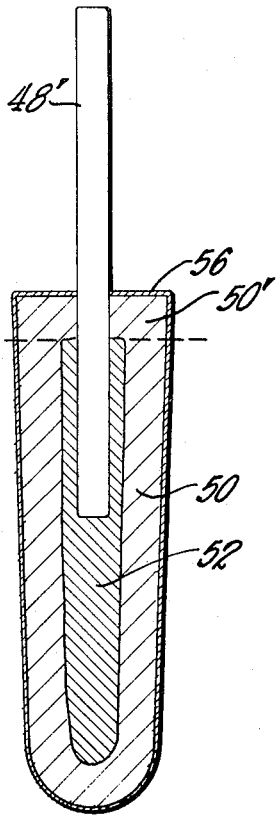
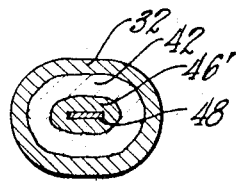
Fig. 8  Fig. 10  Fig. 11
Fig. 9
INVENTOR.
ROBERT H. VROMAN
BY
Harry O. Ernsberger
ATTORNEY

METHOD OF PRODUCING A MOLDED FROZEN BODY

Heretofore it has been conventional practice to produce a frozen confection in the form of an elongated body, such as a body of frozen water ice of various flavors or a body of ice cream provided with a stick or handle frozen in the body and projecting therefrom. It is also conventional practice to coat elongated bodies of ice cream with a coating of chocolate or the like by dipping the frozen body of ice cream in liquid chocolate and congealing the chocolate adhering to the body of ice cream. Frozen confections have also been made wherein a water ice shell is formed in a mold, the unfrozen water evacuated and the water ice shell filled with ice cream or the like.

The present invention embraces a frozen confection or product having a central body of edible substance completely embraced within a frozen shell of a different edible substance where the two substances are of different specific gravities and are successively frozen to form a unitary composite product.

An object of the invention is the provision of a novel frozen confection in which the frozen product incorporates a frozen body of one edible substance embraced within a different frozen edible substance, the invention embracing method steps of successively delivering the substances into a mold in substantially liquid form and, through controlled quiescent freezing, the substances are congealed or frozen to provide a unitary composite edible body.

Another object of the invention resides in a method of producing a frozen confection utilizing flavored water ice as one substance and ice milk in liquid form as a second substance of different specific gravity wherein by controlled refrigeration and the differential specific gravities of the substances a unitary frozen confection is produced wherein one of the substances is embraced within the other substance in frozen form.

Another object of the invention resides in a method of making a frozen confection wherein a mold is substantially filled with a first liquid and subjected to reduced temperature or subfreezing conditions to freeze or solidify a portion of the first liquid to form a shell, evacuating an unfrozen portion of the first liquid, filling the resulting cavity defined by the frozen portion with a second liquid and subjecting the second liquid to freezing conditions to provide a frozen layer of the second liquid contiguous with the shell with a portion of the second liquid in unfrozen condition, introducing into the mold above the second liquid a liquid of greater specific gravity than that of the second liquid whereby the liquid of the lesser specific gravity is displaced by the liquid of higher specific gravity, and subjecting the liquids to freezing conditions until all of the liquids are frozen resulting in a multiconstituent frozen confection.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of thee invention, which may be preferred, in which:

FIG. 4 is a sectional view of a mold on a reduced scale illustrating a step in the method involving delivering an edible substance into the mold;

FIG. 5 is a sectional view of a mold illustrating another step in the method involving freezing an inner body of edible substance within an outer layer of a different edible substance;

FIG. 6 is a sectional view of a mold illustrating another step in the method of forming a frozen confection;

FIG. 7 is a sectional view of a mold illustrating a succeeding step in the method of forming a frozen confection involving displacing by gravity one liquid edible substance with another liquid edible substance;

FIG. 8 is a sectional view of a mold with the completed frozen confection prior to its removal from the mold;

FIG. 9 is a transverse sectional view through the mold and frozen confection, the view being taken substantially on the line 9—9 of FIG. 8;

FIG. 10 is a vertical sectional view of a mold illustrating a modified form of frozen product or confection made according to the method in the invention, and FIG. 11 is a sectional view of the frozen confection shown in FIG. 10 with an outer coating of a different edible substance.

Figures 1, 2, 3:
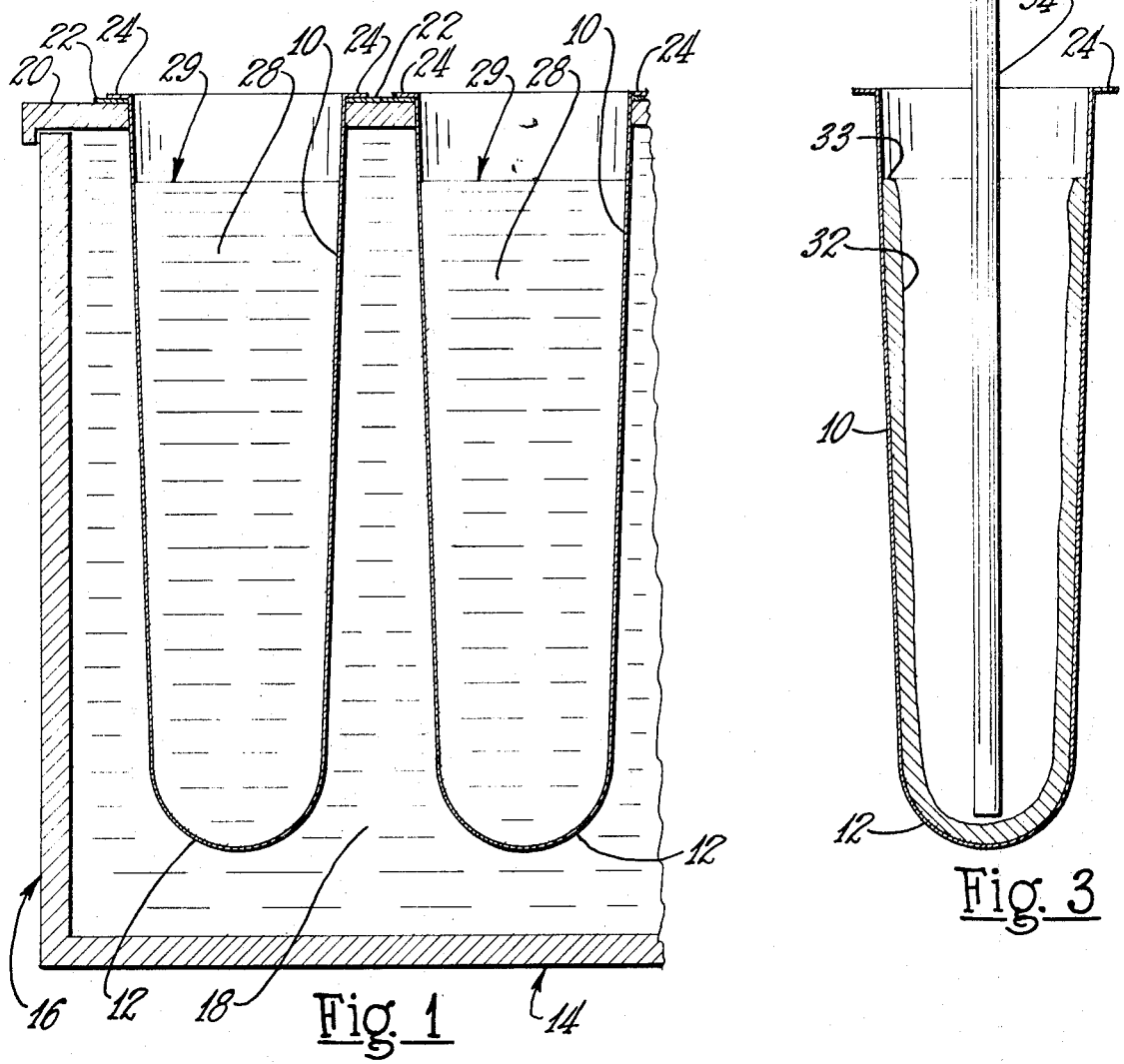
FIG. 1 is a fragmentary sectional view of a container containing a refrigerating or cooling medium or liquid in combination with means carrying a plurality of confection-forming molds disposed in heat-transferring relation with the refrigerating medium.
FIG. 2 is a top plan view of the confection-forming molds shown in FIG. 1.
FIG. 3 is a vertical sectional view of a mold illustrating a step in the method of forming a frozen confection of the invention.

While the method of the invention is especially adaptable for producing frozen confections of elongated configuration, each equipped with a handle member or stick, it is to be understood that the method may be utilized in producing frozen confections of other configurations of a character wherein one edible liquid substance is of a specific gravity to displace another liquid substance in forming the frozen confection or product.

Referring to the drawings in detail and initially to FIGS. 1 and 2, the edible substances used in forming the frozen confection are contained in molds 10 which are made of stainless steel or similar metal having nonoxidizing characteristics, the molds having a cross sectional contour preferably generally oval, as shown in FIG. 2, the elongated wall regions of each mold tapering downwardly and inwardly and terminating in a curved closed bottom 12. The upper ends of the molds are open to facilitate introduction of edible substances and extraction of the frozen confection from the molds.

A container or tank 14 preferably of annular shape of conventional construction has a circular outer side wall 16 which provides an annular chamber containing a brine solution 18 or other suitable medium for freezing or refrigerating the confections in the molds. Rotatably mounted on the upper open end of the tank 14 is a planar member or mold carrier 20 which provides a means supporting a plurality of the molds 10. The planar mold support member 20 is of annular shape, covering the upper open end of the annularly-shaped brine tank 14. Mounted upon the upper surface of the planar member or mold support means 20 is a relatively thin plate 22, preferably of stainless steel, fashioned with openings to receive the molds 10.

The upper end of each of the molds 10 is fashioned with an outwardly extending peripheral flange 24 which is fused, soldered or otherwise bonded to the plate 22 to form a liquid tight joint. The openings in member 20 snugly accommodate the molds 10 in the manner shown in FIG. 1.

The molds 10, shown in FIGS. 1 and 2, are of actual size utilized in fashioning frozen confections of the invention. The annular brine tank 14 and the circular planar mold-support member 20 are of a radial dimension to accommodate radially arranged rows of molds 10 for rotation relative to the brine tank 14 about the axis of the planar member 20, this arrangement being of conventional construction in the production of frozen confections.

It has been found expedient in production to utilize radial rows of molds 10 with five or more molds in each radial row. It has been found that the brine solution 18 should be maintained at a temperature in a range between 15° and 35° below zero Fahrenheit to accomplish the congealing or freezing of the edible substances of the confection in a reasonably short period of time.

One of the features of the method of the invention resides in the sequential introduction into the molds of edible ingredients while in liquid or flowable condition, the edible ingredients having different specific gravities enables the displacement of one ingredient by another ingredient by gravity.

The method is particularly adaptable for forming a frozen confection or body of at least two edible ingredients, substances or constituents in which one edible ingredient is a flavored or sweetened water ice and another edible ingredient is ice milk or the like which has been whipped but is in liquid or flowable condition. In the description of the steps in the method shown in FIGS. 1 and 3 through 9, the flavored water or water ice may be referred to as a first edible ingredient, substance or liquid and the whipped ice milk as a second edible ingredient, substance or liquid.

The water ice constituent for the confection is of greater specific gravity than the ice milk constituent. Other edible substances, congealable at reduced temperatures, may be utilized in fashioning a confection according to the method of the invention where the substances are of different specific gravities.

FIGS. 1 and 3 through 8 illustrate successive steps in the formation or production of the frozen confection of the invention. The brine solution 18 in the tank is continuously maintained at a substantially uniform temperature in a range of 15° to 35° below zero Fahrenheit. The annular plate 20, carrying the molds 10, is about nine feet in diameter and is continuously rotated at a comparatively low speed of about one revolution in seven minutes, the method steps being performed or carried on without interrupting rotation of the plate 20 and the molds 10.

In carrying out the method of the invention, the molds are first filled with flavored or sweetened water 28 at a filling station, the molds being filled to a level 29 which is about one-half inch or more from the top or upper open end of the mold, the level 29, shown in FIG. 1, being about five-eighths of an inch from the upper end of the mold. Due to the low temperature of the brine or refrigerating medium 18, the sweetened water begins to freeze at the wall regions of the mold, the progressive freezing or congealing of the water occurring from the mold wall inwardly of the mold.

When the water or water ice has been frozen to a desired thickness, the frozen portion provides a frozen water ice shell or layer 32 which may be any desired thickness, this being controlled by the length of time that the water is subjected to the subfreezing temperature before the remaining unfrozen water is extracted. When a water ice shell 32 of desired thickness has been formed, such as a shell or layer of about one-eighth of an inch in thickness, a tube 34 connected with a conventional evacuator 36 is inserted into the central region of each of the molds, as shown in FIG. 3, at an extracting station, with the lower end of the evacuating tube 34 slightly above the frozen water ice shell in the bottom in each shell.

The evacuator is operated to remove the unfrozen or uncongealed sweetened water contained within the frozen water ice shell 32. After the unfrozen water ice is evacuated, ice milk in liquid or flowable condition is delivered into the frozen water ice shell 32 in each mold at the ice milk delivery station, the unfrozen ice milk being shown at 38 in FIG. 4. The water ice shell 32 is partially filled with ice milk up to a level 39 which is preferably in a range of from five-sixteenths to five-eighths inch below the upper terminus 33 of the water ice shell providing a space 40 shown in FIG. 4.

By the continued exposure of the mold 10 for a predetermined or controlled period of time, the region of the liquid or unfrozen ice milk adjacent the water ice shell 32 is progressively congealed or frozen inwardly to form a layer or body 42 of frozen ice milk, as shown in FIG. 5.

The thickness of the layer or body 42 of frozen ice milk is dependent upon the length of time the ice milk is subjected to the subfreezing temperature.

As the freezing brine surrounds the molds 10 and the shells 32 of water ice, the freezing of the contents of the mold occurs progressively inwardly toward the central region of the mold, and hence the layer 42 of frozen ice milk embraces a central core region of liquid or unfrozen ice milk 44. When the layer 42 of frozen ice milk in each of the molds is of a desired thickness, sweetened water is delivered into the space above the frozen and unfrozen ice milk embraced within the frozen water ice shell 32, the sweetened water being indicated at 46 in FIG. 6.

The liquid ice milk is of a lesser specific gravity than the specific gravity of sweetened water. Due to the difference in the specific gravities of the two liquids, the liquid of greater specific gravity, viz. the sweetened water 46 moves or falls downwardly in the central region occupied by the liquid ice milk which, being of a lesser specific gravity, moves or migrates upwardly as it is displaced by the sweetened water 46. Thus, as shown in FIG. 7, the sweetened water 46 occupies the central or core region of the confection and the displaced liquid ice milk 44 occupies the space 40 at the upper region of the frozen water ice shell 32.

As freezing by the brine is continuous, progressive inward congealing or freezing of the water ice core 46' occurs, the frozen water ice core occupying the position shown in FIGS. 8 and 9, and progressive freezing of the liquid ice milk 44 above the water ice core 46 forms a frozen portion 44' of ice milk. As freezing continues, the constituents 44 and 46 progressively freeze or congeal toward the central region or longitudinal axis of the mold 10, and a stick 48 may be inserted through the viscous or partially frozen ice milk before it is completely frozen as at 44', and the stick projected into the viscous or partially frozen water ice core 46', as shown in FIG. 8, the stick providing a handle for the frozen confection.

Freezing is continued in the brine until the water ice 46' and the ice milk 44' become completely frozen or solidified, completing the formation of the multiconstituent or multilayer frozen confection. The mold 10, containing the completed frozen confection, is then subjected to a hot brine solution for a short period of time to loosen the confection so that it may be readily withdrawn from the mold.

Thus it will be apparent that by the method of displacing one liquid by another liquid of different specific gravity, an inner core or body of frozen liquid of one specific gravity is embraced in the completed confection by a frozen layer of liquid of a different specific gravity in the completed frozen confection or end product.

The apparatus for carrying out the method is conventional wherein the annular holder or plate 20 supporting radially arranged rows of molds 10 moves slowly through a freezing brine and the method steps performed at successive stations. The steps in the method are progressively carried on during continued exposure of the molds to the freezing brine so that there is no interruption of exposure of the molds to the freezing brine.

A typical example of the time periods between successive steps in the method is as follows: At a first station a radial row of the molds 10 is filled with sweetened water 28 to the level 29 indicated in FIG. 1. With the brine in the tank 14 maintained at about 20° below zero Fahrenheit, it requires about 67 seconds to freeze the water ice shell 32, shown in FIG. 3, to a thickness of about one-eighth inch. The unfrozen sweetened water within the frozen shells 32 is then quickly evacuated by the evacuator or suction device 36, this step requiring about three seconds.

The second liquid, such as unfrozen or flowable ice milk, is then delivered into the frozen water ice shells 32 to the level indicated at 39 and is subjected to progressive freezing by the freezing brine for a period of about 105 seconds providing a layer or body 42 of solidified or frozen ice milk as illustrated in FIG. 5. A liquid, such as unfrozen sweetened water 46, is delivered into the space 40 in each mold, occupying the position illustrated in FIG. 6.

As both of the liquids 44 and 46 are unfrozen and flowable, the difference in the specific gravities of the liquids causes the liquid 46 of greater specific gravity to displace the liquid 44 so that the liquids occupy the respective positions illustrated in FIG. 7 with the liquid ice milk 44 of lesser specific gravity being above or floating on the liquid 46, such as sweetened water of greater specific gravity. This step requires about 142 seconds. As freezing progresses the stick 48 is inserted to the position shown in FIG. 8 and freezing continued until the constituents are frozen.

The thickness of the layers or bodies of water ice and ice milk are controlled by varying the lapsed time between successive steps in the method herein described. Thus a multilayer or multiconstituent frozen confection may be fashioned with a thin outer shell of sweetened water ice, a comparatively thick inner layer of frozen ice milk and a relatively small central core of frozen sweetened water ice. By changing the time periods of the successive method steps, the shell 32 may be made of greater thickness, the adjacent or contiguous layer 42 made very thin and the central core region 46' of different sizes.

Through the method of the invention multiconstituent frozen confections may be fashioned of various freezable liquids having different specific gravities or densities to result in various kinds of frozen confections.

The successive freezing steps of the liquid constituents are carried out under quiescent conditions without disturbance of the liquid constituents whereby the contiguous frozen layers are uniformly defined by avoiding turbulence and intermixing of adjacent constituents.

FIG. 10 illustrates a modified form of confection fashioned through the use of the method of the invention. In this form the mold 10' is first filled to the level indicated by the line A—A with a first flowable or liquid ingredient and frozen to an extent to provide a shell or layer 50. For example, the first flowable ingredient may be whipped ice milk. The central region embraced by the frozen shell 50 is whipped ice milk in an unfrozen or flowable state or condition. The region above the level A—A of the first liquid is then filled with a second liquid or flowable ingredient such as flavored or sweetened water.

The flavored water, being of greater specific gravity than the liquid ice milk, moves downwardly displacing the unfrozen ice milk contained within the frozen shell 50, the liquid ice milk flowing or migrating to the region above the water and floating on the water. The flavored water, when frozen, forms the central frozen core 52. The freezing is continued whereby the core 52 of flavored water becomes solidified or frozen and the displaced ice milk 50' above the line A—A becomes solidified or frozen whereby the frozen water ice is wholly embraced within a frozen shell of the ice milk.

In forming the confection, a stick 48' is inserted through the displaced ice milk 50' and projected into the core 52 while these constituents are in partially frozen or viscous condition so that, upon completion of the freezing cycle, the stick 48' is fixedly frozen in the confection. The mold 10' is then subjected to increased temperature as, for example, a hot brine solution so that a completed frozen confection may be readily withdrawn from the mold 10'.

FIG. 11 illustrates the completed confection of FIG. 10 having a coating 56 of an edible substance applied to the exterior of the frozen ice milk constituent 50. The coating 56 applied onto the ice milk shell 50, 50' may be chocolate, fudge or other flavored edible substance. The coating may be applied by dipping the frozen confection in a bath of coating substance or by spraying the edible substance onto the exterior surface of the frozen confection.

Through the use of the method of the invention, a frozen confection may be fashioned of two or more edible constituents, ingredients or substances, the ingredients being in a flowable or liquid state and of differential specific gravities whereby one ingredient is caused to displace another in fashioning a frozen confection wherein one ingredient is embraced within another ingredient in the end product.

While the frozen confection illustrated in the drawings is of elongated shape and slightly tapered to facilitate withdrawal of the confection from a mold, the frozen confection of the invention may be of other shapes. For example, the confection may be fashioned in a frusto-conical shape, a substantially circular cylindrical shape or other configuration that may be formed in a mold.

In the forms of frozen confection described herein, the stick or handle 48 or 48' may be of wood, cardboard, compressed fibers, resinous plastic or other suitable material.

It is apparent that, within the scope of the invention, modifications and different arrangements may be made other than as herein disclosed, and the present disclosure is illustrative merely, the invention comprehending all variations thereof.

I claim:

1. The method of producing a molded frozen body comprising at least two edible ingredients including the steps of delivering a first ingredient in a flowable state into a mold cavity partially filling the cavity, subjecting the mold and the first ingredient to a subfreezing environment for a period of time sufficient to form a frozen shell-like portion of the first ingredient, delivering a second flowable ingredient of greater specific gravity than the specific gravity of the first ingredient into the mold and above the first ingredient, displacing by gravity the unfrozen flowable portion of the first ingredient with the flowable second ingredient whereby the unfrozen portion of the first ingredient is caused to float upon the second ingredient, and subjecting the unfrozen portions of the ingredients to a subfreezing environment to freeze the unfrozen portions of the ingredients with the frozen portion of the first ingredient into a unitary frozen body.

2. The method according to claim 1 including the step of inserting a stick in an unfrozen portion of an ingredient as it is being frozen.

3. The method of producing a molded frozen body of flavored water and whipped ice milk including the steps of delivering whipped ice milk in a flowable state into a mold cavity partially filling the mold, subjecting the mold and whipped ice milk to a subfreezing environment for a period of time sufficient to form a shell-like layer of a portion of the whipped ice milk, delivering flavored water of greater specific gravity than the specific gravity of the whipped ice milk into the mold and above the whipped ice milk, displacing by gravity the unfrozen flowable portion of the whipped ice milk with the flavored water whereby the unfrozen flowable portion of the whipped ice milk is caused to float upon the flavored water, and subjecting the unfrozen flavored water and whipped ice milk to a subfreezing environment to freeze the unfrozen flavored water and whipped ice milk with the prefrozen whipped ice milk into a unitary frozen body.

4. The method according to claim 3 wherein a stick is inserted in unfrozen portions of the whipped ice milk and flavored water as they are being frozen.

5. The method of producing a molded frozen confection including the steps of delivering whipped ice milk in flowable condition into a mold cavity to partially fill the mold cavity, subjecting the mold and ice milk to a subfreezing environment for a period of time sufficient to form a frozen shell of ice milk at the wall of the mold, delivering flavored water into the upper region of the mold and above the ice milk, displacing the unfrozen ice milk in the shell with the flavored water by gravity by reason of the difference in the specific gravities of the whipped ice milk and the flavored water, and subjecting the mold to the subfreezing environment for a period of time sufficient to freeze the unfrozen flavored water and whipped ice milk into a unitary frozen confection.

6. The method of producing a frozen body including the steps of delivering a first edible ingredient in flowable condition into a mold cavity, subjecting the mold and first ingredient to a subfreezing environment for a period of time sufficient to freeze a shell-like portion of the first ingredient, extracting the residual unfrozen portion of the first ingredient from the mold, delivering a second flowable edible ingredient of a specific gravity different from that of the first ingredient into the shell-like portion in the mold, subjecting the mold to the subfreezing environment for a sufficient period of time to effect solidification of a portion of the second ingredient, delivering an additional quantity of the flowable first ingredient into the mold above the unfrozen portion of the second ingredient, displacing the unfrozen porton of the second ingredient with the additional quantity of the first ingredient by reason of the difference in the specific gravities of the respective ingredients whereby the flowable portion of the second ingredient of lesser specific gravity floats upon the flowable portion of the ingredient of greater specific gravity, and subjecting the unfrozen ingredients in the mold to the subfreezing environment to solidify all of the ingredients into a unitary frozen body.

7. The method according to claim 6 including the step of inserting a stick in the unfrozen portions of the ingredients as they are being frozen.

8. The method of producing a molded frozen confection including the steps of delivering flavored water into a mold cavity, subjecting the mold containing the flavored water to a subfreezing environment for a period of time sufficient to form a frozen water ice shell, extracting the residual unfrozen water from the mold, delivering flowable whipped ice milk into the shell of water ice, subjecting the whipped ice milk to a subfreezing temperature for a sufficient period of time to effect the freezing of a portion of the whipped ice milk within the frozen water ice shell forming a shell of whipped ice milk, filling an upper portion of the mold above the whipped ice milk with flavored water, displacing by gravity the flowable unfrozen whipped ice milk with the flavored water under the influence of the difference in specific gravities of the flavored water and ice milk, and subjecting the mold to the subfreezing environment to freeze the flavored water and displaced ice milk into a unitary body.

9. The method of producing a molded frozen confection including the steps of delivering flavored water into a mold cavity, subjecting the mold containing the flavored water to a subfreezing environment for a period of time sufficient to form a frozen water ice shell adjacent the wall of the mold, extracting the residual unfrozen water from the mold, delivering flowable whipped ice milk into the frozen water ice shell, subjecting the whipped ice milk to the subfreezing environment for a sufficient period of time to effect the freezing of a second shell of frozen whipped ice milk within the first frozen shell, filling an upper portion of the mold above the unfrozen whipped ice milk with flavored water, displacing by gravity the unfrozen flowable whipped ice milk within the second shell with the flavored water by reason of the difference in specific gravities of the flavored water and whipped ice milk whereby the cavity within the shell of frozen whipped ice milk is filled with flavored water with the unfrozen whipped ice milk floating upon the flavored water, subjecting the mold to the subfreezing environment to freeze the water and displaced whipped ice milk into a unitary body, and inserting a stick into the whipped ice milk and flavored water before the water and whipped ice milk are completely frozen to a solidified state.

10. The method of producing a frozen composite body including the steps of delivering a first edible liquid ingredient into a mold, subjecting the mold and first liquid ingredient to a subfreezing temperature for a period of time sufficient to form a frozen shell of a portion of the first liquid ingredient, extracting the unfrozen liquid portion of the first ingredient from the frozen shell, delivering a second edible liquid ingredient of a different specific gravity from that of the first liquid ingredient into the frozen shell, subjecting the second liquid ingredient to subfreezing temperature for a sufficient period of time to effect solidification of a portion of the second liquid ingredient to form a second frozen shell, delivering an additional quantity of the first liquid ingredient into the mold above the frozen and unfrozen portions of the second ingredient in the mold, displacing the unfrozen liquid portion of the second ingredient with the added first liquid ingredient by reason of the difference in the specific gravities of the respective liquid ingredients whereby the liquid ingredient of lesser specific gravity floats upon the liquid ingredient of greater specific gravity, and subjecting the unfrozen liquid ingredients in the mold to subfreezing temperature to solidify the ingredients into a frozen body.

* * * * *